Patented Nov. 14, 1933

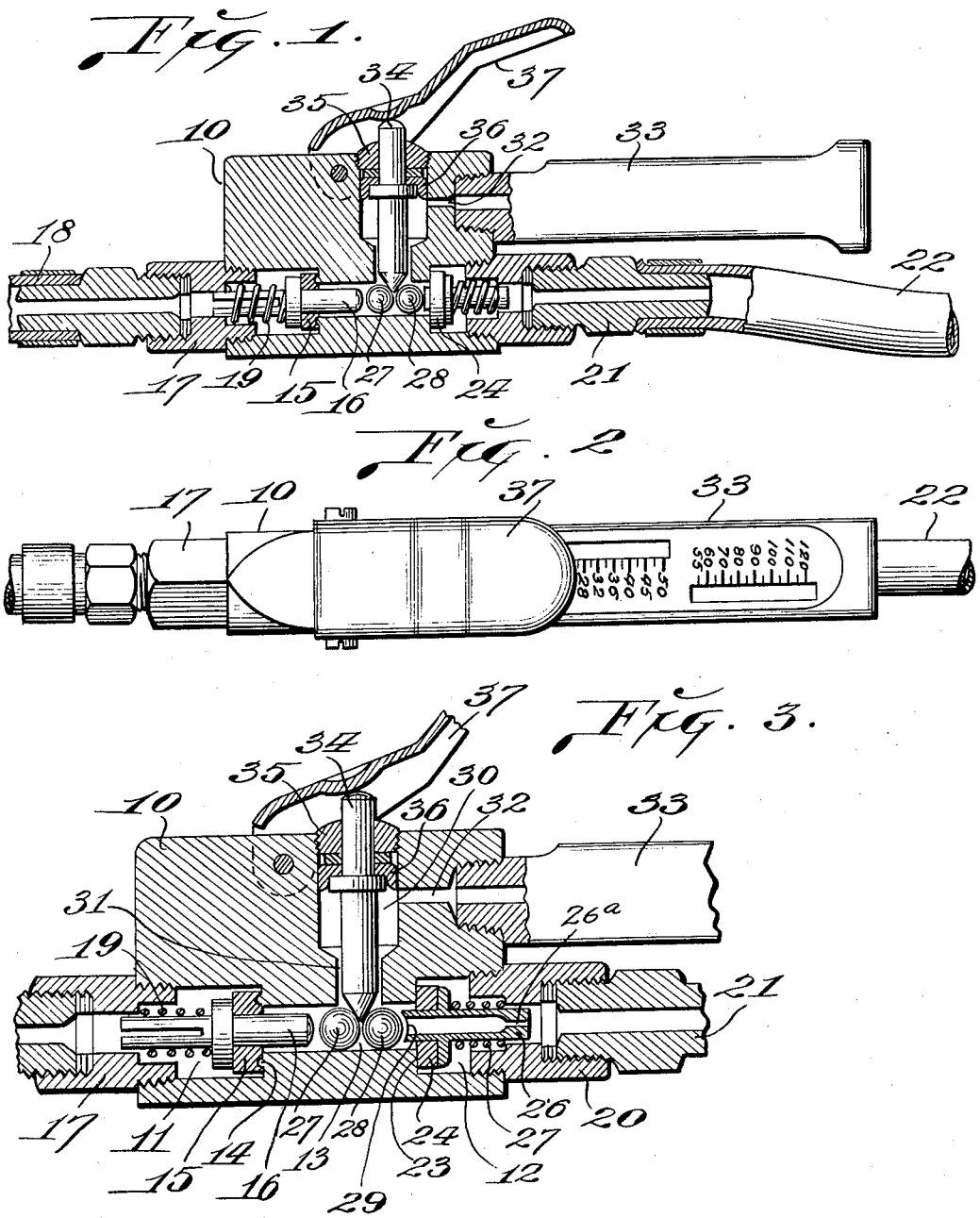

1,935,181

UNITED STATES PATENT OFFICE 1,935,181

COMBINED TIRE INFLATER AND GAUGE

George E. Farley, South Gate, Calif., assignor to Service Equipment Company, South Gate, Calif., a corporation of California Application June 10, 1929, Serial No. 369,636
Renewed February 13, 1932

2 Claims. (Cl. 152—11.5)

My invention relates to a combined tire inflater and gauge and the structure herein set forth is an improvement on the combined tire inflating valve and gauge that forms the subject matter of U. S. Letters Patent No. 1,666,283, issued to my assignee April 17th, 1928.

The principal objects of my invention are, to generally improve upon and simplify the construction of the gauge disclosed in my aforesaid patent as well as other similar devices, and further, to provide a combined inflating valve and gauge that is relatively simple in construction, inexpensive of manufacture, capable of being readily manipulated and which is very effective in performing the functions for which it is intended, and particularly, for accurately indicating the air pressure within the pneumatic tire or other pneumatic member that is being inflated or deflated.

Further objects of my invention are, to provide a combined tire inflater and gauge, that has comparatively few operating parts, the same being arranged and protected, so as to minimize the possibility of their becoming inoperative under ordinary usage, and further to arrange the valve members within the device so as to practically eliminate the leakage of fluid pressures from the device.

A further object of my invention is, to provide a combined inflater gauge of the kind referred to, with a valve located between the gauge and the flexible tube that is connected to the valve stem of the tire or other inflatable member and which valve is constructed and actuated so that when the device is in use the fluid pressure of the tire or other inflatable member is equalized with the pressure prevailing in the flexible tube, thereby accurately registering upon said gauge, the pressure within the tire or other inflatable member.

With the foregoing and other objects in view, my invention consists in certain novel features of construction and arrangement of parts that will hereinafter be more fully described and claimed and illustrated in the accompanying drawing, in which:

Fig. 1 is a vertical longitudinal section taken through the center of a combined tire inflater and gauge constructed in accordance with my invention.

Fig. 2 is a top plan view of the combined inflater gauge.

Fig. 3 is an enlarged vertical longitudinal section taken through the gauge body and showing in detail the construction and arrangement of the fluid pressure control valves and the means utilized for unseating the same charge.

Referring by numerals to the accompanying drawing which illustrates a practical embodiment of my invention, 10 designates a substantially rectangular block of metal that forms the body of the device and formed in the lower portion thereof and in longitudinal alignment with each other, are valve chambers 11 and 12, that are connected by a duct 13, which latter is smaller in diameter than said valve chambers.

Formed between the inner end of chamber 11 and the corresponding end of the duct 13 is a valve seat 14, upon which normally rests a disc valve 15 of rubber, fibre or the like and which is carried by a valve stem 16. The outer portion of stem 16 is mounted for reciprocatory movement within a nipple or coupling 17, to which latter is connected a flexible tube 18 and which latter is connected to a suitable source of fluid pressure supply.

Arranged on the outer portion of stem 16 is an expansive coil spring 19 that bears against valve 15 and which spring, together with the pressure in tube 18 normally holds said valve upon its seat 14.

Seated in the body 10 and closing the valve chamber 12, is a nipple or coupling member 20 to which is detachably connected a tubular stem 21 that is carried by the inner end of a short hose or flexible tube 22 and the latter carrying on its outer end a swivelled chuck or head, that is adapted to engage the end of the filling nipple that forms a part of the valve on the tire tube or other inflatable member.

Formed between the inner end of valve chamber 12 and the duct 13 is a valve seat 23, on which normally rests a valve 24 of rubber, fibre or the like, and said valve being mounted upon a tubular valve stem 26 that projects into the opening through the nipple or coupling 20.

The duct or opening through this stem 26 has its outer portion materially reduced in diameter to form restricted opening 26ª.

Arranged on valve stem 26 and bearing against the rear side of valve 24 is an expansion spring 27, the tension of which is practically the same as the tension of spring 19.

Loosely arranged within duct 13, between the inner ends of the stems 16 and 26, is a pair of identical hard metal balls 27 and 28. Ball 27 is adapted to engage against the inner end of stem 16 when said ball is moved outwardly toward said stem and ball 18 is adapted to engage the inner end of the tubular stem 26 when moved outwardly toward same.

In order that ball 28 may function as a valve and close the opening through the tubular stem the inner end thereof is provided with a concave seat 29.

Formed in the upper portion of the body 10 and disposed at right angles to the valve chambers 11 and 12 and duct 13, is a valve chamber 30 and leading from the lower end thereof downwardly and communicating with the intermediate portion of duct 13 is an opening 31. Leading horizontally through the body 10 above the valve chamber 12 is a small duct 32 and seated in the forward end of the body and communicating with this duct 32 is the inner end of a pressure gauge 33, preferably of the type disclosed in my copending application for U. S. Letters Patent, filed June 10th, 1929 Ser. No. 369,367.

Arranged for reciprocatory movement through valve chamber 30 and the opening 31 is a plunger 34 having a conical or tapered lower end that is adapted to engage between the balls 27 and 28 and the upper portion of this plunger operates through a screw plug 35 that is seated in body 10 and which closes the upper end of valve chamber 30.

Arranged on the plunger 34 and fitting snugly against the inner face of the chamber 30 is a cup leather washer or packing 36 having a depending marginal portion and under normal conditions or while the plunger is at its uppermost limit of movement this cup leather packing occupies a position just above the duct 32 that leads to the pressure gauge 33. The relation of the tapered end of the plunger 34, the valve stems 16 and 26, the balls 27 and 28, and the packing 36 is such that on depression of the plunger the duct 32 is first closed, valve 24 then opened, and finally the valve 15 lifted from its seat, and upon release of the handle the inverse operation of the elements occurs.

Pivotally mounted on the upper portion of the body 10 is a short hand lever 37 that bears on the upper end of plunger 34.

Under normal conditions the pressure of the air or other fluid in the supply tank or line, together with the pressure exerted by expansive spring 19 retains valve 15 upon its seat 16 and such condition exists until said valve 15 is unseated by outward movement of the ball 17 against valve stem 16.

When the chuck or head on the end of the flexible tube 22 is applied to the tubular valve stem of the tire or other inflated member and the valve in said stem is unseated, fluid pressure from the inflated member will pass through the hose 22, thence through connections 21 and 20, thence through tubular valve stem 26 and from thence upwardly through opening 31 valve chamber 30 and port 32 into the gauge 33, with the result that the plungers or moveable parts of said gauge will be actuated to indicate on the graduated scales of said gauge, the pressure of the compressed air in the tire or other inflated member.

If, upon making a test of the pressure in a tire or the like, it is found that the pressure is below the normal or desired degree, the operator, in order to permit additional air pressure to pass from the source of supply through the inflater to the tire, depresses handle 37, thereby moving valve comprising the cup leather washer on said plunger, downwardly so as to close or cut off communication from valve chamber 30 of the port 32 that leads to the gauge.

As plunger 34 is thus moved downwardly, its conical lower end engages the balls 27 and 28 and moves the same apart and as ball 28 engages on concave seat 29 it first closes the opening through tubular stem 26 and then moves said stem and the valve outwardly against the resistance offered by spring 27 so as to unseat said valve and establish communication between duct 13 and valve chamber 12.

As ball 27 is moved away from ball 28, said ball 27 engages the inner end of valve stem 16, thereby moving the same outwardly against the resistance offered by spring 19 and valve 15 is moved away from its seat 14 so that fluid pressure from the tank or source of supply is free to pass through chamber 11, port 13, chamber 12 and connections 20 and 21 to the hose 22 that has the chuck or head on its outer end connected to the filling nipple of the tire.

After fluid pressure is thus admitted to the tire or other inflated member and it is desired to gauge the pressure within said tire, the operator releases pressure upon the handle 37 and the combined pressure of spring 19 and the fluid pressure entering valve chamber 11 from the source of supply, will first move valve 15 unto its seat, thereby cutting off the further flow of fluid pressure into the tire and an instant after valve 15 is seated, valve 24 will engage upon its seat 23 and as the plunger 34 is forced upwardly between movement of the balls 27 and 28 toward each other ball 28 will leave the concave seat 29 at the inner end of stem 26, thereby permitting the fluid pressure from the tube or other inflated member to equalize with the pressure in valve chambers 30 and 12 and tube 22, so that an accurate reading of the pressure within the tire or other inflated member will be shown upon gauge 33.

Due to the construction and arrangement of the parts of the inflater, and particularly the stems 16 and 26, the balls 27 and 28 and the plunger 34, there is a short time interval between the closing of the valve 15 and the closing of valve 24 and the subsequent movement of ball 28 away from its seat 29 and a further time interval between the movement of the ball 28 and the opening of duct 32 and this time interval is sufficient to permit the pressure from the tube or other inflated member to equalize through the connections to the gauge so that the latter will accurately register the tire pressure.

It will be understood that while the valves 15 and 24 are open to permit fluid pressure to pass from the source of supply to the tire, cup leather washer 36 is positioned below port 32 so that no pressure can enter said port and the gauge 33 and such condition exists until plunger 34 subsequently moves upward a sufficient distance to permit the cup leather washer to pass above port 32.

I have demonstrated in practice that in order to equalize the pressure within the gauge through the inflater and in the connections to the tube or other member that is being inflated, it is necessary to provide a short time interval between the closing movement of the valves 15 and 24 and such time interval is provided for by regulating the length of the valve stems that carry said valves and also the position of the cup leather packing 36 on the plunger 34 and by properly constructing these parts valve 15 is seated slightly before valve 24 is seated and just before the spherical valve 28 leaves its seat 29 the cup leather packing 36 moves above the port 32, thus permitting the pressure to equalize so that the gauge will accurately register the pressure in the member that is being inflated or deflated.

Thus it will be seen that I have provided a combined tire inflater and gauge that is relatively simple in construction, inexpensive of manufacture and which may be conveniently employed for controlling the inflation of pneumatic tires and the like and also for conveniently obtaining accurate readings of the pressure that is admitted to the tires or other inflated members.

It will be understood that minor changes in the size, form and construction of the various parts of my improved combined tire inflater and gauge may be made and substituted for those herein shown and described without departing from the spirit of my invention, the scope of which is set forth in the appended claims.

I claim as my invention:

1. In a combined tire inflater and gauge, a body provided with a main fluid pressure duct, tubular connections leading from the ends of the duct, one to a source of compressed air and the other for attachment to the tire, a pair of oppositely arranged spring pressed valves normally resting on seats within said duct, one constituting an inlet from the source of compressed air and the other an outlet to a tire, a pair of spherical members arranged in the duct between said valves, a manually operable plunger having one end arranged to move between and separate said spherical members to open said valves, a branch fluid pressure duct leading from the main duct between the valves therein, a valve carried by said plunger for closing said branch duct, a fluid pressure gauge connected to the body and communicating with said branch duct, and a restricted orifice by-passing the outlet valve when said valve is closed, said plunger valve being so arranged that it closes the branch duct before the unseating of the said inlet valve.

2. In a combined tire inflater and gauge, a body provided with a main fluid pressure duct, tubular connections leading from the ends of the duct, one to a source of compressed air and the other for attachment to the tire, a pair of valves normally resting on seats within said duct, one constituting an inlet from a source of compressed air and the other being resiliently impelled and constituting an outlet to a tire, a manually operable plunger arranged to unseat said inlet and outlet valves, a branch fluid pressure duct leading from the main duct between the valves therein, a valve carried by said plunger for closing said branch duct, a fluid pressure gauge connected to the body and communicating with said branch duct, and a restricted orifice by-passing the outlet valve when said valve is closed, the construction and arrangement of the manually operable plunger, the inlet and outlet valves, and the plunger valve for the gauge being such that upon actuation of the plunger in one direction, the branch duct for the gauge is first closed by the plunger valve, the outlet valve then opened, and the inlet valve thereafter lifted from its seat, and upon movement of the plunger in another direction, the said valves are actuated in the inverse order.

GEORGE E. FARLEY.